Sept. 9, 1969　　　　　　H. F. ARENDT　　　　　　3,465,555
ROLLER PRESSES FOR THE REMOVAL OF WATER FROM CLEAN WET WASHING
Filed March 30, 1966　　　　　　　　　　　　　5 Sheets-Sheet 1

INVENTOR
HANS FRITZ ARENDT

BY Jacoline E. Davidson
ATTORNEY

Sept. 9, 1969  H. F. ARENDT  3,465,555
ROLLER PRESSES FOR THE REMOVAL OF WATER FROM CLEAN WET WASHING
Filed March 30, 1966  5 Sheets-Sheet 3
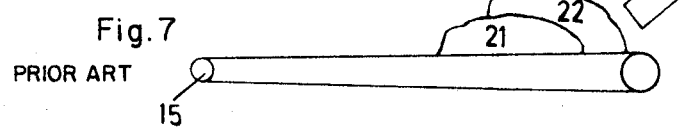
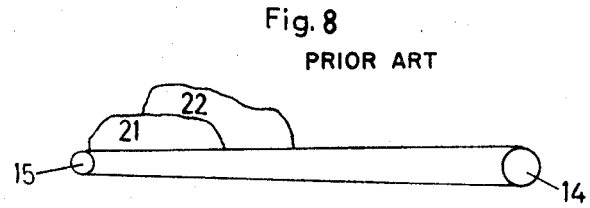
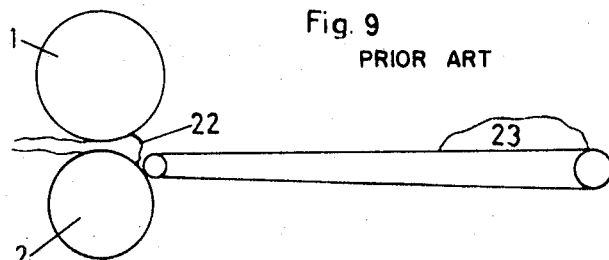
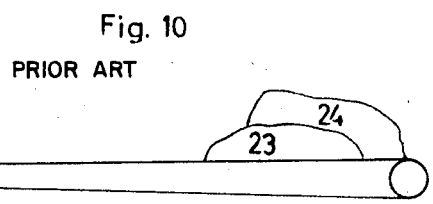
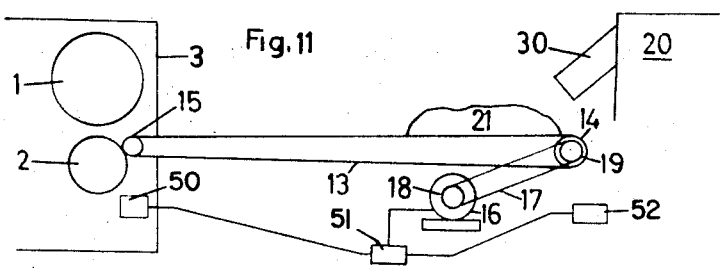
INVENTOR
HANS FRITZ ARENDT
BY Jacobi & Davidson
ATTORNEY Sept. 9, 1969    H. F. ARENDT    3,465,555
ROLLER PRESSES FOR THE REMOVAL OF WATER FROM CLEAN WET WASHING
Filed March 30, 1966    5 Sheets-Sheet 4
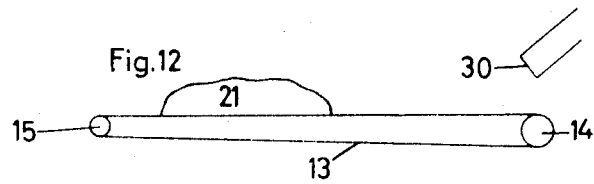
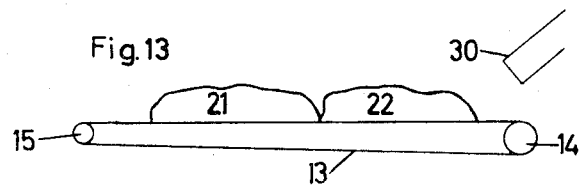
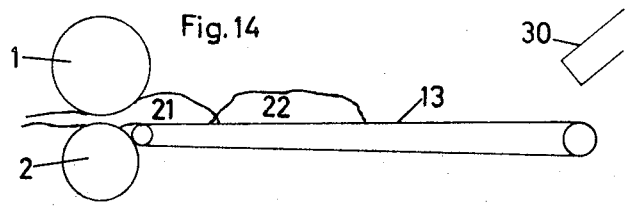
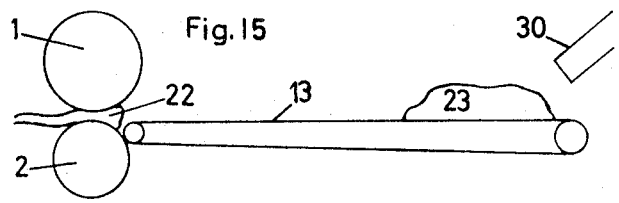
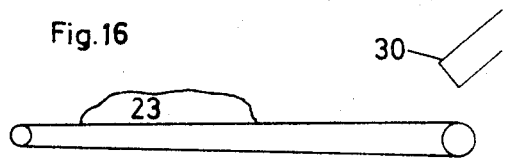
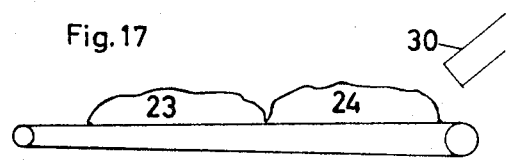
INVENTOR
HANS FRITZ ARENDT
BY *Jacobi & Davidson*
ATTORNEY United States Patent Office 3,465,555
Patented Sept. 9, 1969

3,465,555
ROLLER PRESSES FOR THE REMOVAL OF WATER
FROM CLEAN WET WASHING
Hans Fritz Arendt, 712 Bietigheim, Wurttemberg,
Bleichinsel, Germany
Filed Mar. 30, 1966, Ser. No. 538,757
Claims priority, application Germany, Apr. 7, 1965,
A 48,863; Nov. 17, 1965, A 50,807; Mar. 16, 1966,
A 51,857
Int. Cl. D06f 45/22; F26b 13/30
U.S. Cl. 68—244                                          12 Claims

ABSTRACT OF THE DISCLOSURE

A roller press for the removal of water from clean wet washing in which at least one roller, against which the washing is pressed, is rigid and pervious to water. Thus, the excess amount of water which gathers at the point of pressure application in such a roller press is permitted to enter the pervious roller whence it is drained off. In a preferred embodiment the roller press contains two rollers, the top one of which is elastic and the bottom one of which is rigid and perforated. A vacuum may be applied at the point where the washing is exposed to the pressure in order to more efficiently perform the operation. In another preferred embodiment the elastic roller is composed of several juxtaposed compressed air containers in which the compressed air compartments do not communicate with each other. The several juxtaposed compressed air containers have straight cylindrical surfaces along their circumferences and are made such that a smooth cylindrical surface results. Adjustable and controllable conveying means is provided for feeding loads of washing to the nip formed by the two rollers.

---

This invention relates to roller presses for the removal of water from clean wet washing.

For removing the water from clean wet washing it is customary to use presses, such as those in which the clean wet washing is led through one or more pairs or sets of rollers under different pressures. Up to now these presses were designed to incorporate rigid or elastic rollers.

All of the known types of presses, however, do not provide a satisfactory performance, because they are incapable of removing a sufficient amount of water, so that there will always still remain a residual moisture in the order of more than 50%, in most cases 60%. It is the object of the present invention to provide improvements in or relating to these types of roller presses for the purpose of achieving less residual moisture.

According to one embodiment of the invention, the foregoing is accomplished by providing a roller press in which at least one roller, against which the washing is pressed, is rigid and pervious to water.

The invention is based on the recognition that the low degree of water removal is due to the fact that too much water remains at the point of pressure application. According to the aforementioned embodiment of the invention, the water is permitted to enter into, for example, a perforated roller which is thus pervious to water, from where it may be easily drained off.

In a preferred type of the aforementioned embodiment, the roller press is composed of two rollers, the top one of which is elastic and the bottom one of which is rigid and perforated. From the point of pressure application the water is then pressed into the bottom roller and is drained off therefrom.

According to another embodiment of the invention, a vacuum, i.e. a suction effect, is produced at the point where the washing is exposed to the pressure, in order thus to intensify the pressure effect and to drain off or evaporate the water to a still greater extent. Most suitably, this is accomplished by providing a vacuum container having an opening extending throughout the entire width of the perforated roller, with the width of the opening corresponding almost to the range of pressure application. This may be effected either by providing a vacuum container within the roller, with the cross-sectional area of the container almost corresponding to a circular sector, or else by surrounding the roller with a jacket which is open within the range of pressure application and which is under the action of a vacuum. In the present invention, the application of the vacuum in combination with the use of a rigid, perforated roller, to large-scale system installations designed for a dry washing throughput of about 1,000 kilograms per hour, provides the considerable advantage of a far greater water removal then would otherwise be possible. It is thus possible to achieve residual moisture contents of about 25%. One reason why known presses also do not operate to full satisfaction is that the washing packs or bundles are of continuously varying dimensions, and a high pressure is exerted within the range of agglomeration of concentration of the washing pack, whereas only a slight pressure or no pressure at all is exerted at the tail ends thereof.

For this reason therefore, and in accordance with a further novel feature of the invention, there is provided an elastic roller composed of several juxtaposed compressed-air containers, which are each elastic and closed in themselves and which has straight cylindrical surfaces along their circumferences. Such types of compressed-air containers can be made in a similar way to that in which an elastic layer is applied or vulcanized respectively upon the carcass or body of automobile tires so that a smooth cylindrical surface will result.

In the aforementioned novel type of elastic roller, the pressure inside the various compressed-air containers is equal, and ranges between 7 and 15 a.e.p. (atmospheric excess pressure), preferably at about 10 a.e.p. when using a rigid counter roller. The pressure, however, may be adapted to any particular conditions, and is dependent not only upon the kind of counter roller employed, but also upon the desired residual moisture and the required feeding speed. The aforementioned values are based on large-scale system installations with a dry washing throughput of about 1,000 kilograms per hour, a residual moisture content of less than 25%, and a throughput or feeding speed of 2.5 metres per minute.

It has been proposed in the past to use two automobile tires to form an elastic roller. However, such tires were coated with a hose, and the spaces resulting from the shape of the tires were filled out in some way or other. The difficulty with such a proposal, however, was that each of the compressed-air containers had different elasticity, and additionally that the portions which were filled with the filler, had different elasticity values than the remaining portion.

In the present invention, however, all compressed-air containers are elastic in themselves and are capable of being moved completely independently of one another. Accordingly, if a large washing pack is being passed through within the range of the one container, it will be exposed or subjected to the pressure applied, just as a small washing pack which is being led through the roller press at the same time, but within the range of action of another compressed-air container, will be exposed or subject to the pressure.

Washing machines discharge the washed or clean wet washing in the form of individual items or lots, whereas the roller presses as described hereinbefore, operate continuously. In addition thereto, and as already mentioned, it is important that the washing items or lots as discharged from the washing machine, are fed to the roller press if possible in equal layer thickness, so as not to exceed a certain preselected height of the washing items.

These aforementioned difficulties with known arrangements will now be described with reference to FIGS. 6 to 10 of the accompanying drawings, which show one conventional type of arrangement in which a washing machine 20, via an ejecting channel 30, discharges a washing lot 21 onto a conveyor belt 13 moving at a continuous, uniform speed from the right to the left, i.e. from a driving roller 14 to a transfer or delivery roller 15. About 10 seconds after the ejection of the lot 21, there is ejected the lot 22. Hence, the lots 21 and 22 will partly overlap each other in such condition as they are fed, by the conveyor 13 to pass through the rollers 1 and 2 of the roller press. The next lot of washing 23 is not ejected by the washing machine until two or three minutes later so that in the meantime, as can be seen from FIG. 9, the lot 22 has been almost completely fed through the roller press. There is thus a period of time in which the roller press remains idle and unused until the lot 23 (FIG. 9), and the lot 24 (FIG. 10) which is ejected or discharged 10 seconds later, reach the rollers of the roller press.

Accordingly, this conventional type of arrangement has the disadvantage of causing the aforementioned periods of idle or unoccupied time, and moreover, the washing mountains composed of the lots 21 and 22 or 23 and 24 are caused to become higher than would occur if a continuous conveyance of the washing had been possible.

All of these conventional arrangements are improved by a still further feature of the present invention. This further feature resides in the fact that after the ejection or discharge of one or several lots of washing, a rapid movement is imparted to the conveyor belt at least for such a period of time until enough space has been cleared or provided for receiving further lots of washing on the conveyor belt, while the processing of the first lot(s) can already have been started. According to still further features of the invention, the conveying means is continuously or uninterruptedly driven at a normal operating speed, corresponding to the normal speed of operation of the continuously operating machine, that is, of the roller press, and the rapid belt travel will only be effected if a special control becomes effective via control means acting in accordance with the operating rhythm of the washing machine.

Washing machines of conventional design are provided with ejector openings arranged at heights varying within certain limits, e.g. between 0.5 and 1.5 metres. For this reason the conveying means, e.g. a conveyor belt, is adjustable in height at its end facing the washing machine and is also capable of being swivelled about the axis of the transfer or delivery roller. Appropriately, the rack frame of the conveying means is mounted to the housing of the roller press in accordance with the respective angle of swing or swivel.

The aforementioned and other features of the invention will now be described in detail with reference to the accompanying drawings, in which:

FIG. 2 shows the same arrangement with a vacuum container provided within the perforated type of bottom roller, whereas

FIGS. 6 to 10 are diagrammatic views of prior art or conventional types of arrangements which have already been described hereinbefore;

FIGS. 11 to 17 are diagrammatic views showing in sequence, the conveying means in its different stages of operation;

Figure 1:
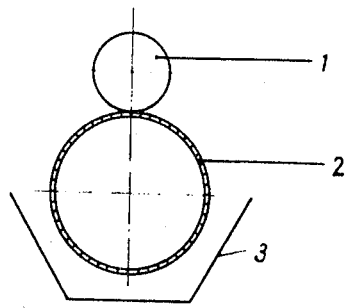
FIG. 1 shows a pair or set of rollers including one perforated type of bottom roller.
Figure 2:
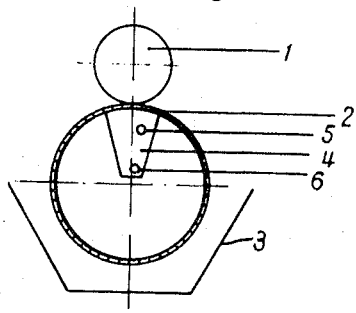
Figure 3:
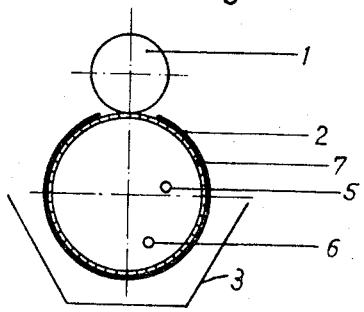
FIG. 3 shows how the bottom roller may be surrounded with a jacket enclosing the entire space of the bottom roller, so that this space will be exposed to the vacuum.

The top roller 1 (FIG. 1) is elastic and may be fabricated in the well-known manner of rubber or a plastics material. It may also be hollow and, depending on the washing to be processed, and the water contents thereof, may have its elasticity varied with the aid of compressed air. The bottom roller 2 is perforated and runs in an open tub 3. The washing is fed in between the rollers, and the pressure exerted by the rollers upon one another, may also be varied in any other conventional way. Either one or both of the rollers are driven. The water as squeezed out by operation of the rollers is not met by a resistance on the bottom roller as it was in prior art arrangements where it was caused to run into the marginal zones of the washing lot (pack), but instead is permitted to enter the perforations and thus flow into the open bottom tub 3. In this way, a better dehydration is achieved than when employing rollers which don't permit the passage of water. In the schematically shown roller press of FIG. 2, there is provided an additional vacuum container 4 having almost the cross-sectional shape of a circular sector with an open top portion facing the roller 2. A vacuum pump is connected to point 5, and a dewatering or drainage pump, e.g. a geared pump, is connected to point 6. In FIG. 3 the vacuum container is constituted by the cylinder 7 which is cut open at the point of pressure application, from which the water is drained off with the aid of the pump via 5 and 6.

Instead of using perforations, it is also possible to use a roller which is covered with a wire-mesh screen. As regards the sealing or packing between the vacuum container and the perforated roller it is not necessary to meet any requirements for achieving highest accuracy, and in fact, it is even desirable to have a certain perviousness in order to avoid an idle running of the pumps. The sealing, therefore, should be such that on one hand this idle running is avoided and that, on the other hand, a sufficient suction effect is produced during the passage of a pack or lot of washing.

Figure 4:
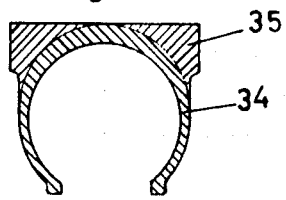
FIG. 4 shows a cross-section taken through one individual compressed-air container.
Figure 5:
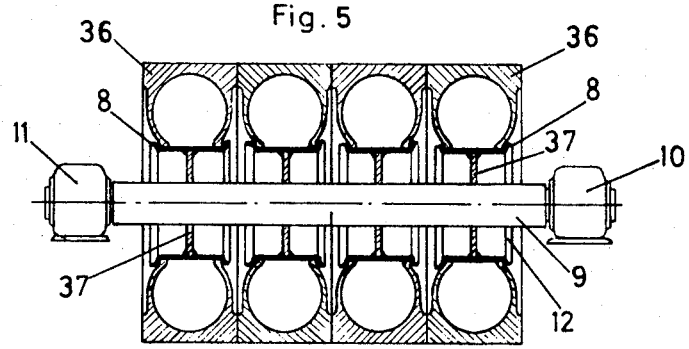
FIG. 5 shows an elastic counter roller which is composed of four individual compressed-air containers.
Figure 6:
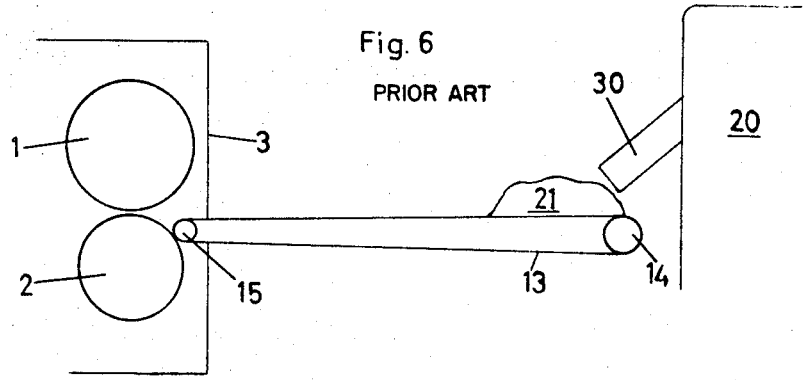

The novel form of elastic top roller as shown in FIG. 5 and designed in accordance with the invention, consists of several elastic bodies of the type shown in FIG. 4. These may be produced from the carcass 34 of automobile tires in such a way that a mass of rubber in the shape shown at 35 is vulcanized thereon, so that there will result a very resistive and wear resistant compressed-air container. In the course of the vulcanizing process the parts 34 and 35 are firmly joined to one another, so that the body of the compressed-air container will be quite uniform and will have a smooth cylindrical surface. When the parts 34 and 35 are so joined, they create a tire 36 having a smooth cylindrical peripheral surface bounded on opposite sides by radially inwardly extending flat surfaces which are parallel to each other and which are substantially perpendicular to the axis of rotation of the tire 36. Each tire 36 is mounted upon a wheel 7 which has rim means 8 along opposite sides thereof. The tire carcass or body 34 is suitably inflated with air so that the inner edges thereof seal against the rim means 8. As aforementioned, each tire is inflated to a pressure range between 7 and 15 atmospheric excess pressure, or, in other words, to a pressure of about 21.7 to 29.7 pounds per square inch. Each wheel 7 includes a spider or plate 37 which serves to mount the wheel upon a shaft 9 whose central axis coincides with the axis of rotation of the wheel. As shown in FIGURE 5, several wheels 36 can be mounted upon the shaft 9, in juxtaposition to one another, with a flat side surface on one tire abutting against a flat side surface on the next adjacent tire. In this manner, the peripheral tire surfaces form a continuous or coextensive surface which causes the several individual tires or compressed-air containers to act as a single elastic roller. The opposite ends of the shaft 9 are mounted in bearings 10 and 11 to permit the roller to rotate. Side plates 12, formed of sheet metal or the like, can be provided at opposite ends of the elastic roller.

Automobile tires of the most various types and dimensions are commercially available, so that a suitable carcass can be easily found to meet all operational conditions. With respect to the conditions of operation, as explained hereinbefore, it has proved suitable to use the carcasses of tires normally used for fork lifters, and the like.

The novel type of conveying means will now be described with reference to FIGS. 11 to 18 wherein the conveyor belt 13 (FIG. 11) is driven by a motor 16 via the belt pulley 18, the belt 17, and the belt pulley 19, so that the upper belt carrying the washing lot 21 which has just been discharged from or ejected by the washing machine 20 via the ejector 30, is driven by the pulley and is moved from the right to the left at a normal conveying speed. This speed corresponds to the rate of passage achievable with the roller press comprising the rollers 1 and 2. Of these, the bottom, rigid and pervious roller 2 is the driven one, and a pick-up device 50, via the control circuit 52, adjusts the motor 16 to the rated full-load (normal) speed. Of course, this speed can also be achieved so that the number of revolutions of the motor 16, or the transmission between the motor 16 and the drive pulley 14, are adjusted accordingly. Instead of the belt drive 17, of course, a gearing system may also be used.

Immediately after the discharge or ejection of the washing lot 21, the control circuit or device 52 is switched by the timing device 51 of the washing machine 20 to cause a rapid travel of the belt, i.e. resulting in the twenty- to thirty-fold speed of the belt 13, thus effecting that the washing lot 21 will reach the position as shown in FIG. 12 within a few seconds. Thereupon, the washing lot 22 is ejected or discharged through the ejector. In this way this lot 22 will assume its position immediately behind the washing lot 21 as seen in the direction of movement of the belt conveyor (FIG. 13). against a flat side surface on the next adjacent tire. In rated full-load speed, so that the lots 21 and 22 are fed in between the rollers 1 and 2 of the roller press. The rigid perforated roller 2, as shown in FIG. 14, seizes the washing lot 21, and causes the loosely coupled roller 2 to follow, so that the differences in diameter respectively resulting from the elasticity of the roller 1 will be incapable of causing any dragging or tearing of the washing. If thereupon, the washing lot 22, as shown in FIG. 15, is about to pass through between the rollers 1 and 2, the washing lot 23 is already being discharged or ejected from the washing machine and, as shown in FIG. 16, such lot is fed in the course of a rapid travel of the belt to the roller press so that, on one hand, the idle running thereof is avoided and, on the other hand, space is immediately provided on the conveyor belt 13 for the discharged or ejected washing lot 24, as shown in FIG. 17. Moreover, it may be seen that the two lots of washing which are respectively being transported, will not fall on top of each other, but will follow one another on the belt 13, so that the height of the piles of washing which are being fed through between the rollers 1 and 2, will be approximately equal.

Figure 18:
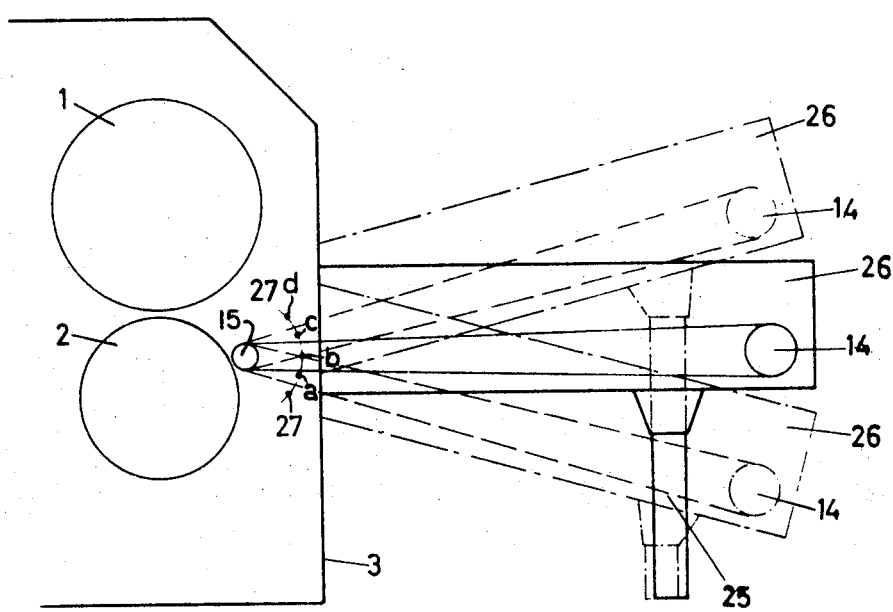
FIG. 18 is an elevational view showing the height adjustability feature of the conveying means of the present invention.

In FIG. 18 it is shown how the conveying means of the present invention can be adapted to the different heights of the discharging or ejecting channel 30 of the washing machine 20 (FIGS. 11 to 17). To this end there is provided an adjustable or interchangeable (replaceable) support 25, which permits the housing 26 of the conveying means to be adjusted to different heights. Since, however, the transfer or delivery roller (pulley 15) must always assume a certain position with respect to the roller 2 to permit an unhindered transfer or delivery of the washing to the roller press, the entire conveying means is swivelled or pivoted about the shaft of the transfer or delivery roller or pulley 15. Thus, the conveying means can be adjusted to the different positions 27, 27a, 27b, 27c and 27d by hooking into previously provided bolts or else by clamping in a slot specially provided in the housing 3.

What is claimed is:

1. A roller press for removing water from clean wet washing, comprising roller means against which the washing may be pressed, said roller means including at least one roller which is elastic and at least one roller which is rigid and pervious to water, said elastic roller is formed of a plurality of juxtaposed individual non-interconnected containers, each having compressed air therewithin, and said plurality of containers forming a smooth continuous cylindrical surface.

2. The roller press defined in claim 1 wherein the pressure of compressed air in each of said containers is substantially the same, such pressure being within the range of 7 to 15 atmospheric excess pressure.

3. The roller press defined in claim 1 wherein said elastic roller and said rigid and pervious roller are arranged to form a nip therebetween.

4. The roller press defined in claim 3 further including vacuum means coupled with said rigid and pervious roller for draining off the water from said washing by means of suction.

5. The roller press defined in claim 4, wherein said vacuum means is disposed within said rigid and pervious roller and includes a vacuum vessel having a substantially sector-shaped cross-section, said vessel having an aperture means disposed adjacent the interior surface of said rigid and pervious roller.

6. The roller press defined in claim 4 wherein said vacuum means is disposed within said rigid and pervious roller and wherein said rigid and pervious roller is surrounded by a jacket member which is substantially closed to retain the vacuum but which has an opening therein to permit said washing to be pressed against said rigid and pervious roller.

7. The improvement defined in claim 3 further including conveying means for feeding loads of washing to said nip.

8. The improvement defined in claim 7 further including speed control means coupled with said conveying means whereby, at selected intervals, the speed of said conveying means can be greatly increased to thereby assure that a further load of washing deposited onto said conveying means will not contact a previously applied load.

9. The improvement defined in claim 7 further including adjustment means for varying the relative positions of said nip and said conveying means.

10. An elastic roller for use in a roller press or the like, said roller comprising a central shaft means, a plurality of discrete, non-interconnected containers mounted upon said central shaft means, each of said containers being substantially annular in configuration and including an outer surface and a pair of opposed side surfaces fabricated of an elastomeric material, said side surfaces being generally flat and said outer surface being generally cylindrical, said containers being disposed in side-by-side relation along said central shaft with one flat side surface of one container abutting against one flat side surface of the next adjacent container, said container outer surfaces being coextensive to thereby define a substantially continuous cylindrical roller peripheral surface, each of said containers having a quantity of compressed air therewithin to pressurize the same.

11. An elastic roller as defined in claim 10 wherein said compressed air pressure within each of said containers is substantially equal.

12. An elastic roller as defined in claim 11 wherein said compressed air pressure is within the range of 7 to 15 atmospheric excess pressure.

References Cited

UNITED STATES PATENTS

| | | | |
|---|---|---|---|
| 1,071,021 | 8/1913 | Bauer | 162—368 X |
| 1,679,444 | 8/1928 | Pagenhart | 152—341 |
| 2,020,645 | 11/1935 | Hook. | |
| 2,144,793 | 1/1939 | Christensen | 68—244 |
| 2,209,760 | 7/1940 | Berry | 100—121 X |
| 3,056,440 | 10/1962 | De Mello | 100—155 X |
| 3,383,884 | 5/1968 | Meyer | 29—113 X |

FOREIGN PATENTS

| | | |
|---|---|---|
| 4,413 | 2/1896 | Great Britain. |
| 142,436 | 10/1953 | Sweden. |
| 300,910 | 11/1954 | Switzerland. |

PETER FELDMAN, Primary Examiner

U.S. Cl. X.R.

29—113; 100—90, 121; 152—341; 162—368